Feb. 8, 1966  H. G. PARKE  3,234,538
BATTERY CONDITION INDICATOR
Filed Nov. 30, 1961
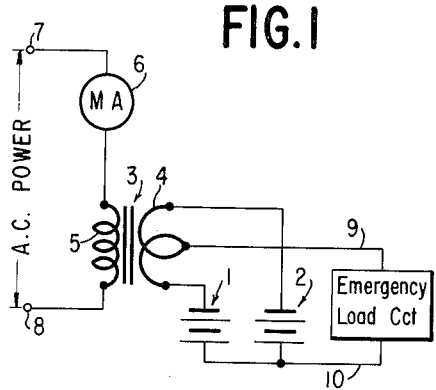
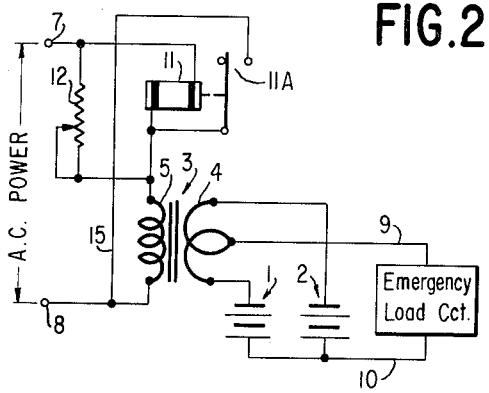
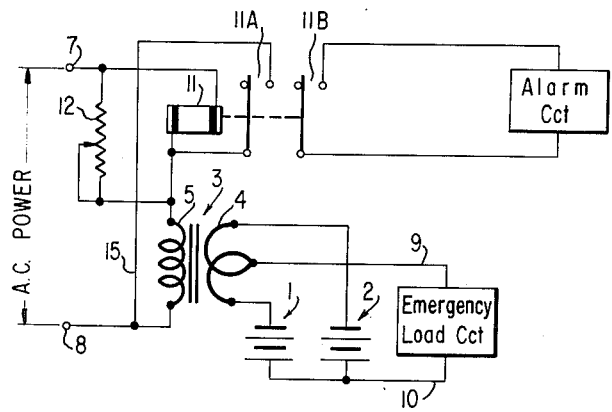
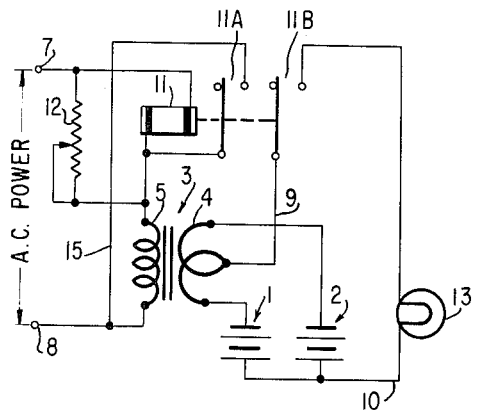
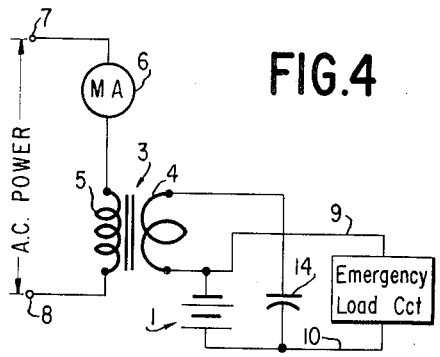
INVENTOR.
HARRY G. PARKE
BY *Imirie and Smiley*
ATTORNEYS.

United States Patent Office 3,234,538
Patented Feb. 8, 1966

3,234,538
BATTERY CONDITION INDICATOR
Harry G. Parke, Brooklyn, N.Y., assignor to Marine Electric Corporation, Brooklyn, N.Y., a corporation of New York
Filed Nov. 30, 1961, Ser. No. 155,995
8 Claims. (Cl. 340—249)

This invention relates to a battery condition indicator and more particularly to apparatus for signaling the weakening or failure of an emergency power source comprising primary or secondary cells, the apparatus indicating a weakening of the battery cells in time to permit their change and thus insure the emergency power when needed.

Leclanché batteries (dry cells) are used for many purposes in electrical installations, most often as a source of emergency or stand-by power. For example, a battery powered lamp may be arranged to automatically illuminate an exit or a control board in the event of normal illumination failure; a battery powered horn may sound in the event of power failure on an elevator, etc. Additional examples are those involved in telephone communication plants and telephone exchanges in which in addition to the regular battery sources for different special services there are smaller reserve batteries which are required to serve only in emergency and almost invariably in such emergencies for only short intervals. Examples of such batteries of small capacity are so-called reserve tripping batteries and the batteries for control of the collection or return of coins in telephone pay stations. Of course the proper functioning of such safety devices will not take place if the batteries involved are aged or damaged to the extent that they are unable to supply the necessary current.

In order to insure that a stand-by battery is in proper condition for emergency service, it is desirable to ascertain that its strength is at a proper value at all times so that in the event that it is required to be connected into emergency service it will be in appropriate condition to perform its function. It is necessary, therefore, to test the battery practically constantly to insure that it is in proper condition. Such testing, under normal known methods, is a drain on the battery and along with aging devitalizes the battery, normally requires complex circuits to perform automatically, or is tedious and labor consuming to perfom at frequent intervals.

The present invention affords a means of testing an emergency stand-by battery regularly and continuously and yet places only a negligible, if any, drain on the battery.

It is a primary object of the invention to provide a means for continuously supervising the capacity, or power, of a set of emergency batteries, either indicating the results or operating an alarm when the capacity of the batteries to provide a current of adequate potential falls below a preselected value, without harming or aging the batteries in any way or interfering with their continuous availability for emergency duty.

Another object of the invention is to provide means for indicating a weakened condition of the batteries of an emergency power source in time to permit changing and substitution of fresh cells thereby to prevent failure of the emergency power source because of failure of the batteries themselves.

A further object of the invention is to provide a battery condition indicator of the above described characteristics which will assure that a warning will always be given should the batteries used as emergency power source deteriorate or otherwise become inadequate to perform their emergency use function.

Still another object of the invention is to provide a battery condition indicator of the above described characteristics which retains the battery under constant surveillance and yet does not drain it of power.

Yet another object of the invention is to provide a battery condition indicator which utilizes a transformer and A.C. power to supervise one or more dry cells acting as emergency power sources, indication being given or effected by flow of A.C. current in the transformer primary without flow of D.C. current in the transformer secondary to which the cells are connected.

A still further object of the invention is to provide a battery condition indicator of the above described characteristics which is connected in a simple circuit having low current drain and economical to operate, but yet which is effective to immediately warn of failure of the batteries to constitute an adequate emergency power source.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a schematic circuit diagram showing one embodiment of the invention wherein an indication of the battery condition is given on a meter.

FIGS. 2 and 2A are schematic circuit diagrams of modified embodiments in which the battery condition indicator incorporates a relay for causing an alarm upon weakening of the batteries.

FIG. 3 is a circuit diagram similar to that of FIG. 2 but showing a circuit in which a lamp, having the sole function of indicating power source failure, is the emergency load.

FIG. 4 is a schematic circuit diagram showing a modified embodiment in which only a single cell, or set of cells, is connected as the emergency power source in series with a transformer secondary.

Referring now more particularly to the drawings, FIG. 1 shows a method of measuring battery resistance while the battery is connected to an emergency circuit. The emergency circuit battery may comprise two equal batteries 1 and 2 each composed of a pair of Leclanché type cells in series. The batteries 1 and 2 are connected together at the terminals of one polarity. The terminals of opposite polarity are connected to the outer ends of secondary 4 of transformer 3. Secondary 4 normally will be a low voltage, low resistance winding consisting of a few turns of heavy wire. Since the batteries 1 and 2 are opposed, in the series circuit with the secondary and as long as they are of substantially equal voltage, no D.C. current flows in the secondary. The emergency load circuit is conventional and includes a switching means for connecting the batteries 1 and 2 to the load circuit only in case of failure of the primary power source so that only the batteries are normally a load on the transformer. Output to the emergency load is taken on conductors 9 and 10 from the center tap of the secondary 4 and the battery junction. The emergency load, therefore, sees the batteries in parallel; if $R_1$ is the internal resistance of 1 and $R_2$ of 2, the effective battery resistance is $$\frac{R_1 R_2}{R_1 + R_2}$$

The winding 4 of transformer 3 sees the two batteries in series, i.e., the secondary battery load is $R_1 + R_2$. The primary 5 of transformer 3 is connected in series with an A.C. milliammeter 6 across a source of alternating voltage 7, 8. If the turns ratio of primary 3 is N, the resistance in series with meter 6 is $N^2(R_1+R_2)$. It may be shown that $$R_1+R_2 \geq 4\frac{R_1 \cdot R_2}{R_1+R_2}$$

and that for $.5R_2 < R_1 < 2R_2$ the equality nearly holds. It is a characteristic of Leclanché cells that aging produces an increase in internal resistance of the cells which, of course, limits the available power output. Thus meter 6 may be calibrated in terms of available battery current on the assumption that $$R_1+R_2 = 4\frac{R_1 R_2}{R_1+R_2}$$

and the readings will be correct for battery pairs that are fairly well matched and conservative for others. The higher the battery resistance the lower the current in meter 6. Thus the calibrated meter reading is indicative of the stored power of the batteries available for application to the load.

In most cases rather than a meter reading, an alarm will be required when battery capacity drops below the danger point, or preselected value of $R_1+R_2$ which would cause the batteries to fail to properly power the emergency load circuit. FIG. 2 shows a circuit for such an alarm. Meter 6 of FIG. 1 has been replaced by A.C. relay 11 which may be shunted by variable resistor 12 for adjustably setting the alarm point. The alarm will occur when $R_1+R_2$ of the batteries increases sufficiently to reduce the current through relay 11 below its hold-in current. Since the pull-in current of a relay is generally much higher than its hold-in current, provision must be made to ensure that relay 11 will pull in upon the installation of new batteries, or the reenergization of 7, 8. This is accomplished by placing contact 11A of relay 11 across the transformer primary 5. Contact 11A is open when the relay is energized. Thus when relay 11 is deenergized, contact 11A through internal or external bias in a conventional manner, closes and shunts the primary 5 through conductor 15 lowering the resistance so that relay 11 will pull in regardless of the value of $R_1+R_2$, then hold in if $R_1+R_2$ is below the alarm set point, and chatter if it is above. Desirably relay 11 is mounted on a thin piece of metal capable of acting as a diaphragm at the chatter frequency, so that the relay gives its own audible alarm.

If desired, the auxiliary contact 11B of the relay can be added as shown in FIG. 2A to operate any external alarm. Contact 11B closes the alarm circuit when relay 11 is deenergized by increase of the internal battery resistance above the selected value.

A modified apparatus for indicating the condition of batteries whether or not they are actually connected to an emergency load is shown in FIG. 3. Contact 11B (a normally open contact when the relay is energized) is placed in series with line 9, alarm light 13, and line 10. Therefore, if source 7, 8 is energized and $R_1+R_2$ is below the set point, relay 11 will be held in steadily, contacts 11A and 11B will be open, and lamp 13 will not be lit. If source 7, 8 fails, relay 11 will be deenergized, contact 11B will close, and lamp 13 will light. If 7, 8 remains energized but $R_1+R_2$ increases above the set point relay 11 will chatter, giving an interrupted signal as described above and lamp 13 will glow dimly (because of the frequency of intermittent current through it). Thus continuous or intermittent lighting of lamp 13 will serve to indicate a failure of the A.C. power or emergency power respectively.

While it is preferred to use the system shown in FIGS. 1, 2, 2A and 3 with two sets of batteries in parallel for supplying the load, it is also possible to use one cell, or one set of battery cells, as shown in FIG. 4. Here a capacitor 14, of a value chosen to present a small impedance to the transformer secondary 4, is used in place of battery 2, and the need for a centertap of the secondary 4 is eliminated. The capacitor prevents the flow of D.C. current in the transformer secondary. The A.C. current which will flow in the transformer will be proportional to one over the battery resistance and, therefore, meter 6 can be calibrated with the same type of scale as for FIG. 1.

While the embodiments described above have dealt particularly with dry cells used as the emergency power source, it should be noted that other types of batteries, including secondary cells of the rechargeable type when utilized as emergency power sources, can be supervised by circuits similar to those illustrated when modified to suit the particular electrical characteristics, including internal impedance, of the cells. Also it is within the purview of the invention to utilize horns or other conventional alarm devices.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A battery condition indicator comprising a source of alternating voltage connected to the primary of a transformer to excite the latter, a battery for an emergency load circuit and whose condition is to be tested connected in series with the secondary of said transformer, means to prevent flow of D.C. current connected in series with the transformer secondary and said battery, and signaling means in series with the primary of the transformer for indicating that the internal resistance of said battery has risen beyond a preselected value.

2. A battery condition indicator according to claim 1 wherein said signaling means comprises a relay.

3. A battery condition indicator according to claim 2 wherein said relay has a normally open contact closeable to shunt the transformer primary upon deenergization of the relay.

4. A battery condition indicator according to claim 3 wherein said relay has a second normally open contact arranged between the battery and an alarm, closing of said second relay contact causing said alarm to operate.

5. A battery condition indicator according to claim 1 wherein said signaling means comprises a meter.

6. A battery condition indicator according to claim 1 wherein said means to prevent flow of D.C. current comprises opposing means in series with the secondary of the transformer comprises a capacitor.

7. A battery condition indicator according to claim 1 wherein said means to prevent flow of D.C. current comprises a second battery having the same number of cells as and connected in opposing polarity to said first battery.

8. A battery condition indicator according to claim 7 in combination with an emergency load circuit having one input terminal connected to the center tap of said transformer secondary and the other input terminal connected to a common terminal between said first and second batteries.

References Cited by the Examiner

UNITED STATES PATENTS

| | | | |
|---|---|---|---|
| 2,046,622 | 7/1936 | Grant | 340—227 |
| 2,891,240 | 6/1959 | Rohulich | 340—227 |
| 3,099,828 | 7/1963 | Kelly | 340—248 |

NEIL C. READ, *Primary Examiner.*

FREDERICK M. STRADER, *Examiner.*